Patented July 6, 1954

2,683,123

UNITED STATES PATENT OFFICE 2,683,123

DEHYDROGENATION CATALYSTS CONTAINING POTASSIUM CARBONATE, ALKALI METAL DICHROMATE, AND IRON OXIDE MADE WITH CARBON BLACK

Clarence C. Schwegler and Frank M. Tennant, Midland, and Frederick J. Soderquist, Essexville, Mich., assignors to The Dow Chemical Company, Midland, Mich., a corporation of Delaware No Drawing. Application November 24, 1950, Serial No. 197,486

4 Claims. (Cl. 252—470)

This invention relates to improved dehydrogenation catalysts produced initially as pellets, pills, in a fine granular form, or other desired shape, and is concerned particularly with such catalysts which are suitable for the dehydrogenation of ethylbenzene to produce monomeric styrene.

Dedydrogenation catalysts are commonly made from one or a mixture of the oxides, especially the "difficulty reducible" oxides, or oxygen-containing salts of such diverse metals as aluminum, chromium, iron, nickel, cobalt, magnesium, zinc, copper, cerium, vanadium, columbium, tantalum, titanium, and the like, often in admixture with an oxide or oxygen-containing salt of lithium or potassium. The oxides can be formed in situ from other metallic compounds by the action of an oxidizing gas. The tungstates, molybdates, silicates, carbonates, and similar salts have been employed in preparing many dehydrogenation catalysts. The literature is replete with suggestions to use specific mixtures as catalysts in specific dehydrogenation reaction.

The active oxides are commonly bound together in a porous mass by a cement which is often the agent which provides, also, the alumina or other oxide constituents of the catalyst. It is common practice to dissolve inorganic salts which yield oxides when heated in water, and to stir the cement or other binder and insoluble oxides into such solution until a uniform thick paste is obtained. The paste is often extruded as a continuous ribbon or rod, and the latter is cut in suitable short pieces to form pellets. The resulting pellets, still moist, are dried, suitably at 80 to 150° C., to remove excess water and to complete the setting of the cementitious binder. When required for use in a dehydrogenation reaction, the pellets are activated by heating to the intended reaction temperature in an oxidizing atmosphere.

Alternatively, the paste can be formed in a shape other than a pellet shape, dried and oxidized as described above. Similarly, the paste can be dried, ground to a powder suitable for use in a fluid bed process, and then activated.

The present invention is based upon the discovery that a particularly efficient catalyst of the type above described results when from 6 to 25 per cent of a carbon black is blended with the other ingredients of such a catalyst prior to the pellet forming operation. The special advantage of such a catalyst is that it enables efficient operation at lower temperatures with consequent increase in equipment life and decrease in by-product formation.

The principal object of the present invention is to provide an improved pelleted catalyst for dehydrogenation reactions, particularly a catalyst for the dehydrogenation of ethylbenzene to styrene, isopropylbenzene to alpha-methylstyrene, diethylbenzenes to divinylbenzenes, ethyltoluenes to methylstyrenes, and the like, having greater efficiency than currently available catalysts.

According to the invention a dehydrogenation catalyst is produced from the normal catalyst-yielding substances for the intended reaction with from 6 to 25 per cent of their weight of a carbon black and with a binder. The catalyst yielding substances are usually metal oxides, as enumerated above, or mixtures thereof. The amount of carbon black used is preferably from 10 to 18 weight per cent, and most desirably from 12 to 15 weight per cent of the catalyst-yielding substance. The catalyst-yielding substance, the carbon black, the binder, and water are mixed to form a thick paste. The paste is then pelleted, and the pellets dehydrated and heated in an oxidizing atmosphere to at least the normal temperature for the intended reaction to remove the carbon black and activate the catalyst. Any oxidizing atmosphere suitable for removing the carbon black and activating the catalyst can be used. Preferably, this atmosphere contains, in addition to the oxidizing agent, the vapors or gas to be dehydrogenated. An oxygen-containing gas is a preferred oxidizing agent. Steam, air, or mixtures of either or both with hydrocarbon vapors constitute suitable oxygen-containing gases. This heating is advantageously at a temperature from 500 to 650° C.

Carbon blacks are generally classified according to the method of production, as furnace blacks or channel blacks, and according to the source, as lamp blacks, gas blacks, acetylene blacks, and blacks from organic oils. It has been found that any carbon black, regardless of the method of production, and regardless of source, can be used according to the method of the invention to produce an improved dehydrogenation catalyst.

The present invention is equally efficacious whether or not another modifying agent is employed. An advantageous modifying agent is methyl cellulose, used as described and claimed in the copending application of one of the present applicants and others, Serial No. 98,636, filed June 11, 1949, now Patent No. 2,603,610.

The following examples illustrate the preparation of preferred cracking or dehydrogenation catalysts, but are not to be construed as limiting the invention:

*Example 1*

2.8 pounds of potassium carbonate and 10.8 pounds of potassium dichromate were dissolved in 20.7 pounds of water; 22 pounds of carbon black sold under the trade name "Superjet Lampblack M 1011," 53 pounds of ferric oxide and 11.4 pounds of an aluminous cement were then thoroughly mixed with the solution to form a smooth paste, which was extruded as rods $\tfrac{3}{16}$ inch in diameter and cut to pellets of $\tfrac{3}{16}$ inch length. The cement used in producing the catalysts of the examples was a commercial slow-setting corrosion resisting refractory cement having the following proximate analysis:

| | Weight per cent |
|---|---|
| $SiO_2$ | 9.5 |
| FeO | 6.6 |
| $Fe_2O_3$ | 4.1 |
| $Al_2O_3$ (includes trace $TiO_2$) | 40.2 |
| CaO | 37.4 |
| MgO | 1.0 |
| S | 0.3 |
| $SO_3$ | 0.32 |
| Insoluble residue | 0.5 |

The pellets were dried at 125° C. for about 24 hours. Ethylbenzene mixed with steam was passed over the pellets at an initial temperature of 650° C. Carbon black was removed and the catalyst activated by this oxidizing atmosphere. After about 36 hours at 650° C. the temperature was gradually lowered to 615° C., at which temperature about 40 per cent of the ethylbenzene was converted to styrene per pass. The temperature at which such a conversion is achieved is considered an effective operating temperature.

*Example 2*

Several catalysts were produced according to the procedure described in Example 1 to show the proportions in which carbon black is useful, and the suitability of different carbon blacks. The compositions employed, the source of the carbon blacks, and the effective operating temperatures are indicated in the table, above, in which parts are by weight.

Substantially similar improvement results if the catalysts of the invention are used to dehydrogenate ethyltoluenes, diethylbenzenes, isopropylbenzene or ethylxylenes.

Equally improved catalysts are produced when a major portion of the iron oxide catalytic agent shown in the examples is replaced in part or in whole by another metal oxide, or by a mixture of other oxides, as enumerated above.

We claim:

1. A method of preparing a dehydrogenation catalyst which comprises mixing potassium carbonate, an alkali metal dichromate, and ferric oxide with from 6 to 25 per cent of their weight of a carbon black and with enough refractory cement and water to make a thick extrudable paste, forming the paste into the desired physical shape, dehydrating the composition, and heating the dehydrated composition in steam at from 500 to 650° C. to remove carbon black and to activate the catalyst.

2. A method of preparing a dehydrogenation catalyst that comprises mixing potassium carbonate, an alkali metal dichromate, and ferric oxide with from 10 to 18 per cent of their weight of a carbon black and with enough binder and water to make a thick extrudable paste, forming the paste into the desired physical shape, dehydrating the composition, and heating the dehyrated composition in steam at from 500 to 650° C. in the presence of ethylbenzene vapors to remove carbon black and to activate the catalyst.

3. A method of preparing a dehydrogenation catalyst that comprises mixing potassium carbonate, an alkali metal dichromate, and ferric oxide with from 10 to 18 per cent of their weight of a carbon black and with enough binder and water to make a thick extrudable paste, forming the paste into the desired physical shape, dehydrating the composition, and heating the dehydrated composition in steam at from 500 to 650° C. in the presence of isopropylbenzene vapors to remove carbon black and to activate the catalyst.

4. A method of preparing a dehydrogenation catalyst that comprises mixing potassium carbonate, an alkali metal dichromate, and ferric oxide with from 10 to 18 per cent of their weight of a carbon black and with enough binder and water to make a thick extrudable paste, forming the paste into the desired physical shape, dehydrating the composition, and heating the dehydrated composition in steam at from 500 to 650° C. in the presence of ethyltoluene vapors to remove carbon black and to activate the catalyst.

| Run No. | Parts Water | Parts $K_2CO_3$ | Parts $K_2Cr_2O_7$ | Parts Cement | Parts Carbon Black | Name of Carbon Black | Parts $Fe_2O_3$ | Parts FeOOH [1] | Effective Operating Temperature, °C. |
|---|---|---|---|---|---|---|---|---|---|
| 2 | 18.6 | 2.8 | 11.1 | 23.7 | 7.9 | "Superjet Lampblack M 1011" | 54.5 | | 615 |
| 3 | 15.8 | 3.1 | 11.9 | 25.5 | 8.5 | ...do... | 25.5 | 25.5 | 620 |
| 4 | 19.5 | 3.3 | 13.0 | 27.9 | 9.3 | ...do... | 32.5 | 14.0 | 620 |
| 5 | 20.6 | 2.9 | 11.4 | 17.9 | 12.2 | ...do... | 55.6 | | 615 |
| 6 | 22.2 | 3.1 | 12.1 | 12.8 | 12.4 | ...do... | 59.6 | | 610 |
| 7 | 22.1 | 3.1 | 12.1 | 12.8 | 12.4 | "Philback A" | 59.6 | | 605 |
| 8 | 18.3 | 3.1 | 12.1 | 12.8 | 12.4 | "Onyx 10" | 59.6 | | 610 |
| 9 | 21.1 | 3.1 | 12.1 | 12.8 | 12.4 | "Sterling No. 99" | 59.6 | | 615 |
| 10 | 22.1 | 3.1 | 12.1 | 12.8 | 12.4 | "Philback O" | 59.6 | | 610 |
| 11 | 21.1 | 3.1 | 12.1 | 12.8 | 12.4 | "Elf O" | 59.6 | | 605 |
| 12 | 27.7 | 3.1 | 12.1 | 12.8 | 12.4 | "Monarch No. 71" | 59.6 | | 610 |
| 13 | 32.0 | 3.1 | 12.1 | 12.8 | 12.4 | "Carbolac No. 1" | 59.6 | | 600 |

[1] The FeOOH used is sold under the trade name YO 2587.

References Cited in the file of this patent

UNITED STATES PATENTS

| Number | Name | Date |
|---|---|---|
| 2,408,986 | Marisic et al. | Oct. 8, 1946 |
| 2,423,309 | Gary | July 1, 1947 |
| 2,428,910 | Foster | Oct. 14, 1947 |
| 2,460,811 | Davies et al. | Feb. 8, 1949 |
| 2,603,610 | Amos et al. | July 15, 1952 |